May 19, 1953  E. EVERHART ET AL  2,639,404
MAGNETRON CIRCUIT

Filed April 3, 1945  3 Sheets-Sheet 1

INVENTORS
EDGAR EVERHART, MELVIN A. HERLIN
WILLIAM V. SMITH, ALEXANDER G. SMITH
BY
*William D. Hall*
ATTORNEY May 19, 1953 E. EVERHART ET AL 2,639,404
MAGNETRON CIRCUIT
Filed April 3, 1945 3 Sheets-Sheet 3
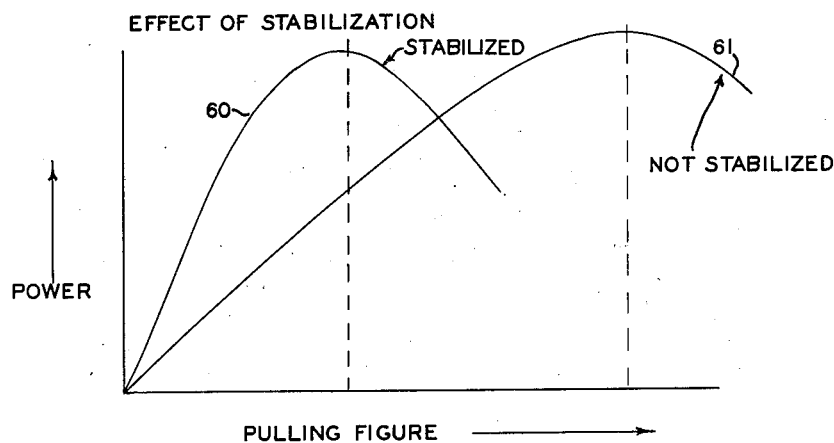
FIG. 6
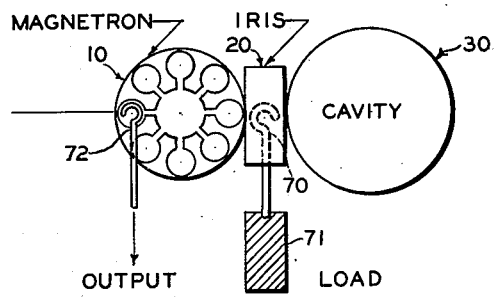
FIG. 7
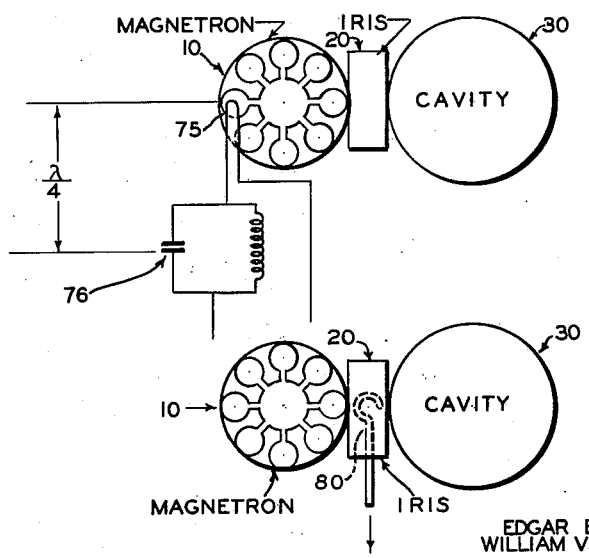
FIG. 8
FIG. 9
INVENTORS:
EDGAR EVERHART, MELVIN A. HERLIN
WILLIAM V. SMITH, ALEXANDER G. SMITH
BY
William D. Hall.
ATTORNEY Patented May 19, 1953

2,639,404

UNITED STATES PATENT OFFICE 2,639,404

MAGNETRON CIRCUIT

Edgar Everhart and Melvin A. Herlin, Cambridge, and Alexander G. Smith, Boston, and William V. Smith, Medford, Mass., assignors, by mesne assignments, to the United States of America as represented by the Secretary of War Application April 3, 1945, Serial No. 586,411

12 Claims. (Cl. 315—39)

Our invention relates in general to electrical oscillators and more particularly to improvements in transit time magnetron type oscillators.

The use of magnetron oscillators has become increasingly more important in the development of electrical apparatus for use at ultra-high frequencies. However, in the use of magnetron oscillators, difficulty has arisen due to the fact that the frequency of oscillation is not easily adjustable and is not independent of changes in loading. This tendency of a magnetron to change its oscillatory frequency when the load is changed is known to those familiar with the art as "pulling." For purposes of quantitative study of such pulling, the expression "pulling figure" is used which may be very briefly defined as a measure of the change in frequency of oscillation, for a given power output, occasioned by changes in load impedance. Further instability is due to the fact that numerous modes of oscillation are possible for a given magnetron and changes in operating conditions can cause the magnetron to change from operation in one mode into another or into a combination of other modes known as multimoding.

Accordingly, it is one of the objects of our invention to provide improvements in magnetron oscillators whereby the operation will be stabilized at a desired frequency. Furthermore, it is another of our objects to provide a means for tuning so that stable operation over a wide range of frequencies is easily accomplished.

In general, our invention embodies an added cavity resonator directly coupled to a magnetron so that the cavity stores energy at a selectable and predetermined oscillatory frequency. The coupling from the magnetron into the above mentioned cavity resonator is provided through an iris which is so designed that it acts as a parallel resonant circuit thus localizing the energy of undesired frequencies or modes at the iris but which passes energy of the desired frequency onto the cavity resonator with only light loading or attenuation. The addition of the cavity and iris stabilizes the operation of the magnetron by causing it to efficiently oscillate within a selected mode at a low pulling figure for a given power output. More satisfactory operation at a high degree of stabilization is made possible by dissipating energy of undesired modes by the use of coupling means, hereinafter known as demoder leads, appropriately placed to remove the energy of undesired frequencies, and subsequently dissipating the energy in a load of some form.

Our invention will best be understood by reference to the appended drawings in which:

Fig. 6 shows curves illustrating the stabilizing effect of the added cavity and iris;

Fig. 7 shows the addition of a demoder lead;

Fig. 8 shows an alternate method of demoding; and

Fig. 9 shows another alternate method of demoding.

Figure 1:
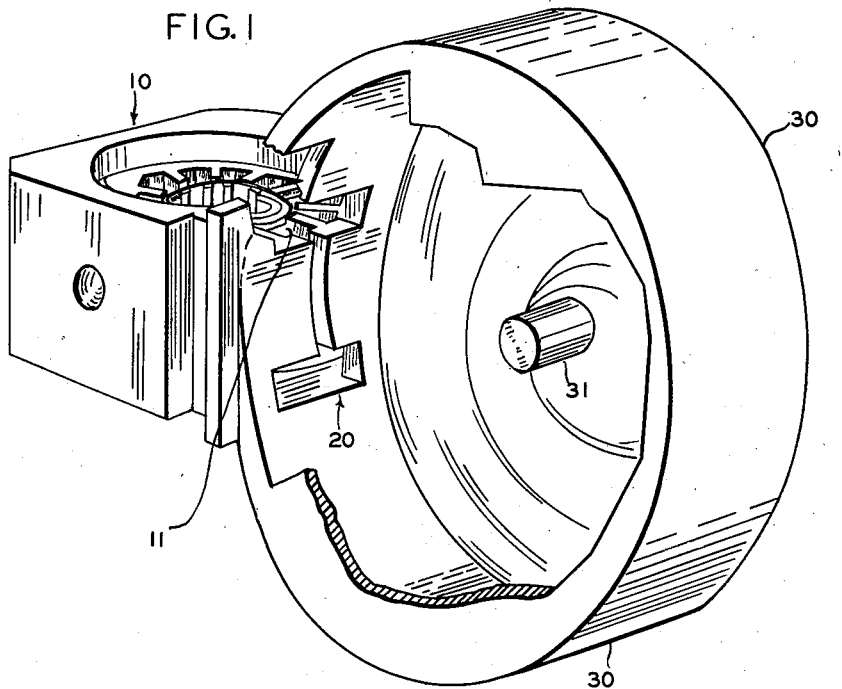
Fig. 1 shows a magnetron with an added cavity and iris.

Shown in Fig. 1 is a magnetron 10 which is a conventional type of magnetron of multi-anode, cylindrical design. One of the cavity resonators 11 of the magnetron is coupled through an iris 20 into an added cavity resonator 30. The iris 20 is formed by three essentially rectangular slots which run through the cavity wall of the added resonator 30, through the shell of magnetron 10, and open into the resonant cavity structure of the magnetron 10. These slots are so disposed with respect to each other as to form one complete H-shaped iris with the slot forming the cross bar of the H running parallel with and opening into one of the cavity resonators 11 of the magnetron 10. The other two slots forming the rest of the H open into the end spaces of the magnetron. This type of iris acts as a parallel resonant circuit whose resonant frequency is determined by the physical dimensions. The cavity structure 30 is a conventional type of passive cavity resonator formed by a conducting material fashioned into a hollow, right cylindrical section the ends of which are closed by plane surfaces also of a conducting material which form an integral part with the cylindrical section. Projecting from one of the end surfaces there is a tuning means 31 which is, in this case, a rod-like conducting member that can be inserted various distances into the cavity to change the cavity capacitance and, therefore, its tuning. The resonator 30 is fastened to the magnetron shell at a portion of its cylindrical surface and it is at this area that the iris 20 couples through into the cavity. The iris 20 enters the cavity in such a manner that the slot forming the cross bar of the H runs along a portion of a circle described about the axis of the cylindrical section forming the resonator 30.

Figure 2:
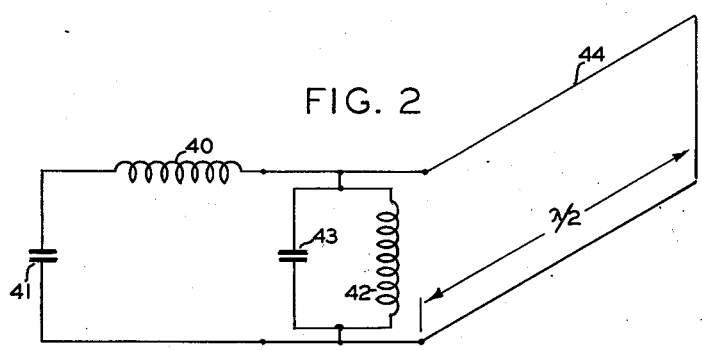
Fig. 2 shows an equivalent electrical circuit of a magnetron, iris, and cavity.

The operation of the above described combination of magnetron, iris, and added cavity will best be understood by reference to Fig. 2 which shows an equivalent electrical circuit representing these elements at a particular desired operating frequency. The magnetron 10 is represented by the series combination of inductance 40 and capacitance 41 which is series resonant at the desired operating frequency. The iris 20 is represented by the parallel combination of inductance 42 and capacitance 43 which is parallel resonant at the operating frequency and is connected across the series combination of 41 and 40. The added cavity 30 acts as a series resonant circuit at the operating frequency and is represented by a half-wave section of transmission line 44 shorted at one end and having the other end connected across the series combination of 40 and 41. At the operating frequency, the parallel resonant circuit representing the iris 20 localizes within its oscillatory elements most of the energy of undesired frequencies developed in the magnetron 10 but passes on the energy of the desired oscillatory frequency to the resonant circuit representing the added cavity 30 so that energy will tend to be stored in the cavity at the desired frequency.

Figure 3:
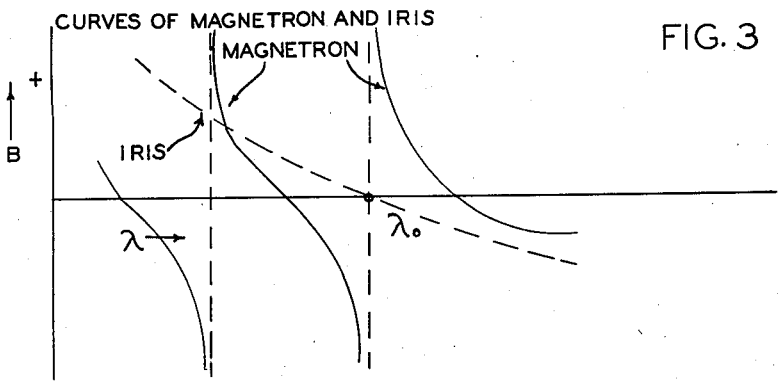
Fig. 3 shows susceptance curves for a magnetron and iris.

To further illustrate the action of the iris 20 and magnetron 10, Fig. 3 shows an example of susceptance curves for these elements in which susceptance is plotted as the ordinate, and wavelength is plotted as the abscissa. These curves are significant in that a resonant wavelength is possible wherever the algebraic sum of the susceptances for the iris and magnetron is equal to zero. Furthermore, it is evident that in order to prevent the resonant points or modes from being brought closer together, the slope of the iris curve must be made small. This can be done by so designing the iris that the ratio of inductance to capacitance is large for a given operating frequency. In the curve represented in Fig. 3, λ₀ is the desired operating wavelength.

Figure 4:
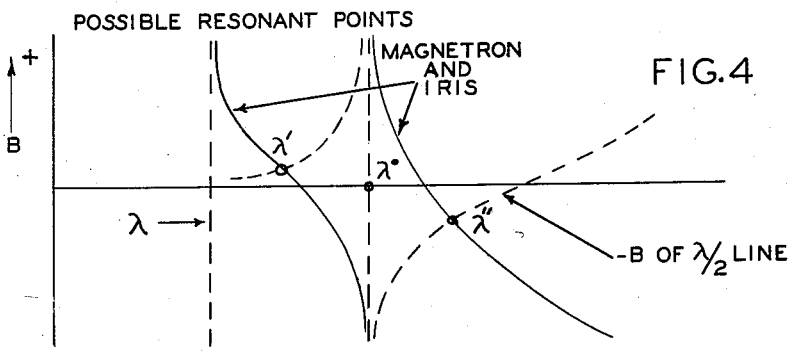
Fig. 4 shows susceptance curves for a magnetron, iris and cavity to determine possible points of resonance.

Fig. 4 also represents curves in which susceptance is again plotted as the ordinate and wavelength as the abscissa. In this case, the algebraic sum of the magnetron and iris susceptances is plotted as one curve, and the negative of the added cavity susceptance is plotted as another curve. The intersections of these two curves represent possible resonant modes for the combination of iris, magnetron, and added cavity. In this figure also, λ₀ represents the desired operating wavelength.

Figure 5:
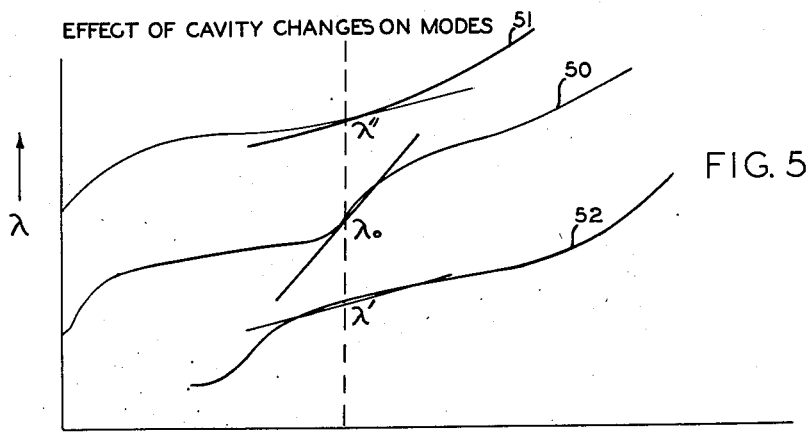
Fig. 5 shows curves which illustrate the effect of cavity changes on the modes of oscillation.

Fig. 5 is included to show which mode is storing energy in the added cavity. Wavelength is plotted as the ordinate, and "d," the equivalent cavity dimensions, is plotted as the abscissa. Three possible modes, 50, 51, and 52, are shown, of which curve 50 is the desired mode. Operating conditions are assumed to be along the dotted vertical line. Since the slope of curve 50 is much greater than the other two curves under the designated operating conditions, it is evident that changes in the added cavity affect this mode much more than the other two, and therefore more energy of this mode is stored in the added cavity.

Shown in Fig. 6 is a typical diagram illustrating the stabilizing effect of the added cavity and iris. Magnetron output power is plotted as the ordinate against "pulling figure." Curve 60 is a typical curve for a stabilized magnetron which can be compared to curve 61 for an unstabilized magnetron. For a given output power, the pulling figure is much lower for curve 60 than for curve 61, illustrating the fact that there is much less change in frequency for the stabilized magnetron during normal operation.

Satisfactory operation with a high degree of stabilization is enhanced by the addition of demoding leads as illustrated in Fig. 7. It has been found that much of the undesired mode energy is localized at the iris, in view of the fact that the iris acts as a parallel resonant circuit, so that a conventional coupling loop 70 when properly placed in the iris 20 will dissipate undesired frequencies in a non-frequency selective load 71 but will not remove the desired frequency. The desired output from the magnetron 10 is removed by a conventional coupling loop 72 placed in a magnetron cavity in a conventional manner.

Fig. 8 illustrates an alternate method of demoding which embodies a conventional coupling means 75 which couples into the magnetron 10 and is connected to a parallel circuit 76 resonant at an undesired frequency. The parallel circuit 76 is placed an integral number of quarter wavelengths from the coupling loop 75 so that high loading is presented to the undesired frequency.

Fig. 9 illustrates another alternate method of demoding in which only a single coupling loop 80 is placed in the iris 20 in such a position that a low impedance and high loading is presented to undesired modes but a high impedance and light loading is presented to the desired frequency.

Of the three demoding methods described in Figs. 7, 8, and 9, the method shown in Fig. 7 has been found to be the most successful in actual operation and has greatly increased the efficiency of operation at high degrees of stabilization.

It will be apparent to those skilled in the art that changes and adaptations can be made in the specific embodiments herein described without departing from the spirit or scope of our invention, and we claim all such modifications and changes as fall fairly within the spirit and scope of the hereinafter appended claims.

What we claim is:

1. An electron device comprising a multi-anode, cylindrical, transit time magnetron embodying a plurality of cavity resonators, a tunable cavity resonator means, said resonator means being essentially a hollow, right circular, cylindrical section for stabilizing the device, one of the said cavity resonators of the magnetron and the said tunable cavity resonator being connected and coupled by a substantially H shaped iris, said iris constituting a parallel resonant circuit at the operating frequency, coupling means coupled with said iris for removing energy of undesired modes, non-frequency selective load means for dissipating the energy of undesired modes, and means connecting the said coupling means to the said load means.

2. An electronic device comprising means for developing electromagnetic oscillations, a substantially cylindrically-shaped tunable cavity resonator, and substantially H shaped iris means connecting a portion of the first mentioned means to the cavity resonator.

3. Apparatus in accordance with claim 2, wherein the means for developing electromagnetic oscillations comprises a transit time type of magnetron embodying a plurality of oscillatory circuits including cavity resonators.

4. A magnetron device comprising an oscillating element for developing electromagnetic oscillations, cavity resonator means, means containing an iris element connecting said cavity resonator means to the oscillating element, and means coupled to at least one of said elements for dissipating the energy in undesired modes of operation of the oscillating element.

5. An electronic device comprising means for developing electronic oscillations, means including a substantially tubular tunable cavity resonator for tuning and stabilizing the frequency of said oscillations, said means for developing electronic oscillations being connected to said tubular cavity resonator by an iris.

6. Apparatus in accordance with claim 5, wherein said iris is substantially H shaped.

7. Apparatus in accordance with claim 5, wherein said iris is anti-resonant at the operating frequency of the device.

8. An electronic device comprising means for developing electronic oscillations and having a plurality of modes of oscillation, and cavity resonator means connected to said first mentioned means for preventing said first means from jumping from a desired to an undesired mode of oscillation, said cavity resonator means including a cavity resonator constituting a series resonant circuit and an iris constituting a parallel resonant circuit coupling said cavity resonator to said first mentioned means.

9. A magnetron device comprising means for developing electromagnetic oscillations, cavity resonator means, means including an iris connecting said cavity resonator means to the first-mentioned means, load means, means coupling said load means to said iris for restricting the modes of operation of the first-mentioned means.

10. A micro-wave generator comprising a multicavity magnetron oscillator, a passive cavity resonator resonant to a desired frequency of said magnetron oscillator, and parallel resonant means connecting said cavity resonator to said magnetron oscillator.

11. The micro-wave generator defined in claim 10 wherein said parallel resonant means is an iris.

12. The micro-wave generator defined in claim 10 wherein said parallel resonant means is an H-shaped iris, and a non-resonant load coupled to said iris.

EDGAR EVERHART.
MELVIN A. HERLIN.
ALEXANDER G. SMITH.
WILLIAM V. SMITH.

References Cited in the file of this patent

UNITED STATES PATENTS

| Number | Name | Date |
|---|---|---|
| 2,200,023 | Dallenbach | May 7, 1940 |
| 2,217,745 | Hansell | Oct. 15, 1940 |
| 2,241,976 | Blewett et al. | May 13, 1941 |
| 2,270,777 | Von Baeyer | Jan. 20, 1942 |
| 2,466,922 | Wax | Apr. 12, 1949 |
| 2,474,938 | Gorn | July 5, 1949 |
| 2,481,151 | Powers | Sept. 6, 1949 |
| 2,493,091 | Sproull | Jan. 3, 1950 |